United States Patent [19]
Ojo et al.

[11] Patent Number: 5,531,808
[45] Date of Patent: Jul. 2, 1996

[54] REMOVAL OF CARBON DIOXIDE FROM GAS STREAMS

[75] Inventors: Adeola F. Ojo, Chatham, N.J.; Frank R. Fitch, Bedminster, N.Y.; Martin Bülow, Basking Ridge, N.J.

[73] Assignee: The Boc Group, Inc., New Providence, N.J.

[21] Appl. No.: 363,187

[22] Filed: Dec. 23, 1994

[51] Int. Cl.⁶ ............................................. B01D 53/047
[52] U.S. Cl. ................... 95/96; 95/101; 95/122; 95/139; 95/902
[58] Field of Search ............... 95/95–105, 117–123, 95/126, 139, 902

[56] References Cited

U.S. PATENT DOCUMENTS

| | | | |
|---|---|---|---|
| 3,266,221 | 8/1966 | Avery | 95/139 X |
| 3,738,084 | 6/1973 | Simonet et al. | 95/105 |
| 3,751,878 | 8/1973 | Collins | 95/105 |
| 3,885,927 | 5/1975 | Sherman et al. | 55/68 |
| 4,233,038 | 11/1980 | Tao | 95/139 X |
| 4,557,735 | 12/1985 | Pike | 95/99 |
| 4,581,044 | 4/1986 | Uno et al. | 95/96 |
| 4,690,696 | 9/1987 | Sircar et al. | 95/97 |
| 4,775,396 | 10/1988 | Rastelli et al. | 55/58 |
| 4,840,647 | 6/1989 | Hay | 95/100 |
| 4,859,217 | 8/1989 | Chao | 95/902 X |
| 4,986,835 | 1/1991 | Uno et al. | 95/99 |
| 5,013,334 | 5/1991 | Maurer | 95/139 X |
| 5,026,406 | 6/1991 | Kumar | 95/139 X |
| 5,152,813 | 10/1992 | Coe et al. | 95/902 X |
| 5,156,657 | 10/1992 | Jain et al. | 95/139 X |
| 5,171,333 | 12/1992 | Maurer | 95/100 |
| 5,232,474 | 8/1993 | Jain | 95/139 X |
| 5,258,058 | 11/1993 | Coe et al. | 95/902 X |
| 5,258,060 | 11/1993 | Gaffney et al. | 95/902 X |
| 5,268,023 | 12/1993 | Kirner | 95/103 |
| 5,292,360 | 3/1994 | Pacaud et al. | 95/902 X |

FOREIGN PATENT DOCUMENTS

| | | | |
|---|---|---|---|
| 0173501 | 3/1986 | European Pat. Off. | 95/96 |
| 0453202 | 10/1991 | European Pat. Off. | 95/97 |
| 59-004414 | 1/1984 | Japan | 95/95 |
| 3-229611 | 10/1991 | Japan | 95/97 |

*Primary Examiner*—Robert Spitzer
*Attorney, Agent, or Firm*—Coleman R. Reap; Larry R. Cassett

[57] ABSTRACT

Carbon dioxide is removed from gas streams comprised predominantly of gases that are less polar than carbon dioxide by passing the gas stream through a bed of type X zeolite having a silicon to aluminum atomic ratio not greater than about 1.15, thereby adsorbing the carbon dioxide from the gas stream. The process is particularly advantageous when applied to the removal of low levels of carbon dioxide from gas streams at temperatures above 20° C.

23 Claims, No Drawings

REMOVAL OF CARBON DIOXIDE FROM GAS STREAMS

FIELD OF THE INVENTION

This invention relates to the removal of carbon dioxide from gas streams, and more particularly to the prepurification of air by the removal of carbon dioxide from air prior to air separation.

BACKGROUND OF THE INVENTION

Gases that occur in nature or which are produced in industrial processes often contain carbon dioxide in small amounts. For example atmospheric air generally contains about 250 parts per million (ppm) carbon dioxide. Because of certain process constraints or a particular end use that the gas is intended for, it may sometimes be desirable or necessary to remove the carbon dioxide from the gas. For example, air that is separated into various component products by cryogenic separation techniques (cryogenic air separation), such as cryogenic distillation or cryogenic adsorption, must be substantially free of both carbon dioxide and moisture, because these operations are carried out at temperatures below the freezing point of these compounds; consequently, if they are not removed they will freeze in and eventually clog the air separation process equipment.

Small amounts of carbon dioxide and moisture are removed from gas streams by various techniques, such as condensation, reversing heat exchange freezing and adsorption. A particularly preferred method is adsorption using an adsorbent which adsorbs carbon dioxide (and water vapor) more strongly than it adsorbs other components of the gas stream. For example, it is common to remove carbon dioxide from an air stream that is to be cryogenically separated, by passing the gas stream through a bed of zeolite 13X. U.S. Pat. No. 3,885,927, issued to Sherman et al. on May 27, 1975, discloses the use of type X zeolite containing at least 90 equivalent percent barium cations for the removal of carbon dioxide from gas streams containing not more than 1000 ppm carbon dioxide, at temperatures of –40° to 120° F. U.S. Pat. No. 4,775,396, issued to Rastelli et al. on Oct. 4, 1988, discloses the adsorption of carbon dioxide from gas streams by pressure swing adsorption at temperatures of –50° to 100° C., the adsorbent having a $SiO_2/Al_2O_3$ molar ratio of from 2 to 100 and containing at least 20 equivalent percent of one or more cations selected from zinc, rare earth, hydrogen and ammonium cations and not more than 80 equivalent percent of alkali metal or alkaline earth metal cations.

Zeolite 13X efficiently removes small amounts of carbon dioxide (and water vapor) from air streams at low temperatures, i.e. temperatures of about 5° C. or lower, because it more strongly adsorbs these components than it adsorbs nitrogen, oxygen or argon. However, the carbon dioxide adsorption capacity of zeolite 13X diminishes rapidly as the temperature of the gas being separated increases, and the separation process becomes infeasible at temperatures above about 20° C. Since ambient temperatures are often considerably above the preferred 5° C. adsorption temperature, for example ambient temperatures of 40° C. or higher are sometimes encountered, and since, because of the heat of adsorption and the heat of gas compression, there is a tendency for adsorption bed temperatures to increase considerably during the course of an adsorption process, it is usually necessary to cool air fed to an adsorption-based air prepurification plant by means of external refrigeration to maintain the gas at temperatures below 20° C. This reduces the overall efficiency of the air separation process, since energy must be consumed to provide the necessary refrigeration.

It would be very advantageous to completely eliminate the need for refrigeration or to significantly reduce the amount of refrigeration required in commercial air separation adsorption-based prepurification procedures, since that would enhance the overall economic attractiveness of the air separation process. The present invention provides a novel carbon dioxide adsorption process which provides such an advantage.

SUMMARY OF THE INVENTION

According to the invention, a gas stream is purified by the removal of carbon dioxide from the gas stream by passing the gas stream through a bed of type X zeolite having a silicon-to-aluminum atomic ratio in the range of about 1.0 to about 1.15 at a temperature in the range of about –50° to about 80° C. The process of the invention can be used to purify any gas that is less polar than carbon dioxide and which contains carbon dioxide as an impurity at partial pressures up to about 25 mbar or more. Typical of gases that can be purified by the process of the invention are air, nitrogen, oxygen, argon, hydrogen, helium, methane, etc.

The adsorbent may be sodium X zeolite, i.e. it may have as substantially all its exchangeable cations sodium ions, or it may have as exchangeable cations one or more of: the various monovalent, divalent or trivalent ions selected from Groups IA, IIA and IIIA of the Periodic Table, lanthanide series ions, chromium (III) ion, iron (III) ion, zinc (II) ion and copper (II) ion. Preferred adsorbents are X zeolite having as exchangeable cations one or more of sodium, potassium, lithium, calcium, magnesium, barium, strontium, aluminum, scandium, gallium, indium, yttrium, lanthanum, cerium, praseodymium and neodymium ions. The most preferred cations are sodium, lithium, calcium, magnesium, aluminum, cerium and lanthanum and mixtures of these.

In a preferred embodiment of the invention, the type X zeolite has a silicon-to-aluminum atomic ratio of about 1.0 to about 1.1, and in the most preferred embodiment it has a silicon-to-aluminum atomic ratio of about 1.0.

The adsorption step of the process of the invention is beneficially carried out at temperatures in the range of about 20° to about 80° C. Very good results are obtained when the adsorption step is carried out at a temperature in the range of about 30° to about 60° C.

The carbon dioxide purification is preferably carried out by a cyclic process, more preferable as pressure swing adsorption (PSA), temperature swing adsorption (TSA), or combinations of these. In the most preferred embodiment, the process is a TSA process.

The carbon dioxide is preferably present in the gas stream at concentrations such that its partial pressure in the gas stream does not exceed about 25 mbar, is more preferably present at concentrations such that its partial pressure does not exceed about 10 mbar, and is most preferably present at concentrations such that its partial pressure in the gas stream does not exceed about 5 mbar.

The process of the invention can comprise the single operation of carbon dioxide adsorption, or it may comprise a combination of purification operations, including carbon dioxide adsorption and one or more of air separation, hydrogen oxidation, carbon monoxide oxidation, etc. In a preferred procedure carbon dioxide is removed from air by the above-described adsorption method and the purified air is separated by cryogenic distillation into nitrogen, oxygen, argon or combinations of two or more of these.

The carbon dioxide adsorption step with the type X adsorbent can also be used to remove moisture from the gas stream, if present. In a preferred embodiment, moisture is removed prior to carbon dioxide adsorption by passing the gas stream through a desiccant, preferably one of the various types of alumina, silica gel or zeolites, or mixtures of these.

DETAILED DESCRIPTION OF THE INVENTION

The process of the invention is particularly useful for removing carbon dioxide at low concentrations i.e. parts per million (ppm) levels, from gas streams at temperatures above about 20° C. Although the process can be successfully used to remove carbon dioxide from gas streams in which the carbon dioxide is present at partial pressures greater than about 25 mbar, it is most effective for removing carbon dioxide from a gas stream when the carbon dioxide is present in the gas stream at concentrations such that its partial pressure in the gas stream is not greater than about 25 mbar, as discussed above.

The adsorbents useful in the process of the invention are the type X zeolites having silicon-to-aluminum atomic ratios not greater than about 1.15, i.e those having silicon-to-aluminum atomic ratios in the range of 1.0 to about 1.15. Preferred adsorbents for use in the invention are the type X zeolites having silicon-to-aluminum atomic ratios in the range of about 1.0 to 1.1, and the most preferred adsorbents are those having silicon-to-aluminum atomic ratios of about 1.0, commonly referred to as low silicon X or LSX zeolites. Due to defects in the structure of the zeolite, impurities, such as occluded alumina and/or aluminates and errors in measurement, apparent silicon to aluminum ratios of type X zeolites as low as 0.9 have been reported. However, the theoretical minimum silicon-to-aluminum atomic ratio is 1.0, and this theoretical minimum is used herein, and it is intended that type X zeolites of the lowest possible silicon-to-aluminum atomic ratio be included within the scope of this invention.

The zeolites may be "sodium X" zeolites, i.e. those whose exchangeable cations are substantially all sodium ions, or they may be any of the many known ion exchanged type X zeolites, i.e. type X zeolites having as exchangeable cations ions other than sodium. Included among the ions that may occupy exchangeable cation sites on the type X zeolite are ions of Groups IA, IIA, IIIA, IIIB of the periodic table, trivalent ions of the lanthanide series of elements, zinc (II) ion, copper (II) ion, chromium (III) ion, iron (III)ion, the ammonium ion, the hydronium ion or mixtures of two or more ions from any of these categories. Preferred Group IA ions are sodium, potassium and lithium ions; preferred Group IIA ions are magnesium, calcium, strontium and barium ions: preferred Group IIIA and IIIB ions are aluminum, scandium, gallium, indium and yttrium; and preferred trivalent lanthanide ions are lanthanum, cerium, praseodymium and neodymium. The most preferred type X zeolites are those having as exchangeable cations one or more ions selected from: sodium, lithium, calcium, magnesium, aluminum, cerium, lanthanum, praseodymium and neodymium ions.

The process of the invention may be carried out in a single adsorption vessel or a battery of two or more beds arranged in parallel and adapted to be operated in a cyclic process comprising adsorption and desorption. In such systems the beds are cycled out of phase to assure a pseudo-continuous flow of purified gas from the adsorption system.

The process of the invention is generally practiced as a cyclical process, such as temperature swing adsorption, pressure swing adsorption, vacuum swing adsorption, or combinations of these. The process is particularly useful for removing small amounts of carbon dioxide from air by temperature swing adsorption. The carbon dioxide removal process is ideally coupled with an air separation process, such as cryogenic distillation of air, to produce high purity nitrogen, oxygen, argon or combinations of two or more of these high purity gas products.

The temperature at which the adsorption step is carried out may vary from a minimum temperature of about −50° C. to a maximum of about 80° C. It has been discovered that the process of the invention is considerable more efficient at temperatures greater than about 20° C. than corresponding processes using conventional adsorbents, particularly when the gas stream being purified contains carbon dioxide at concentrations such that its partial pressure in the gas stream does not exceed about 25 mbar. This feature makes the process advantageous for use in warm weather climates where the temperature during the adsorption step is above about 20° C., or even above about 30° C. Although the adsorption step can be carried out at temperatures up to about 80° C., it is preferable that the temperature not exceed about 60° C. and most preferable that it not exceed about 50° C.

The pressures at which the adsorption step is carried out generally ranges from about 0.2 to about 20 bar, and preferably from about 1 to 10 bar for pressure swing adsorption cycles, and is usually about atmospheric or above for temperature swing adsorption cycles.

When the adsorption process is PSA the regeneration step is generally carried out at temperatures in the neighborhood of the temperature at which the adsorption step is carried out and at an absolute pressure lower than the adsorption pressure. The pressure during the regeneration step of PSA cycles is usually in the range of about 20 to about 5000 millibar, and preferably in the range of about 100 to about 2000 millibar. When the adsorption process is TSA, bed regeneration is carried out at a temperature higher than the adsorption temperature, usually in the range of about 50° to about 250° C., and preferably in the range of about 100° to 200° C. When a combination of PSA and TSA is used the temperature and pressure during the bed regeneration step are higher and lower, respectively, than they are during the adsorption step.

In starting a cyclical process according to the invention, the gaseous feed stream from which carbon dioxide is to be removed is introduced into an adsorption vessel containing a bed of the above-mentioned adsorbent. As the gas passes through the bed of adsorbent carbon dioxide is adsorbed and a substantially carbon dioxide-free nonadsorbed product gas passes out of the adsorption vessel through the nonadsorbed gas outlet. As the adsorption step proceeds a carbon dioxide front forms in the adsorbent bed and slowly moves toward the nonadsorbed gas outlet end of the bed. When the adsorbed carbon dioxide front traveling through the adsorption vessel(s) in which the adsorption step is being carried out reaches the desired point in the vessel(s), the adsorption process in these vessel(s) is terminated and these vessels enter the regeneration mode. During regeneration, the carbon dioxide-loaded vessels are depressurized, if the adsorption cycle is pressure swing adsorption, or heated, if a temperature swing adsorption cycle is employed, or both depressurized and heated, if a combination process is used.

The method of regeneration of the adsorption beds depends upon the type of adsorption process employed. In the case of pressure swing adsorption, the regeneration phase generally includes a countercurrent depressurization step during which the beds are vented countercurrently until they attain the desired lower pressure. If desired the pressure in the beds may be reduced to subatmospheric pressure by means of a vacuum inducing device, such as a vacuum pump.

In some cases, in addition to the countercurrent depressurization step(s), it may be desirable to countercurrently purge the bed with the nonadsorbed product gas stream exiting the adsorbent bed(s). In this case the bed(s) may be countercurrently purged with, nonadsorbed gas, and the purge step is usually initiated towards the end of the countercurrent depressurization step, or subsequent thereto. During this purge step, the purge gas can be introduced into the adsorbent bed from an intermediate storage facility when the adsorption system comprises a single adsorber; or from another adsorber that is in the adsorption phase, when the adsorption system comprises multiple adsorbers arranged in parallel and operated out of phase.

The adsorption cycle may contain steps other than the fundamental steps of adsorption and regeneration. For example, it may be advantageous to depressurize the adsorption bed in multiple steps, with the first depressurization product being used to partially pressurize another bed in the adsorption system. This will further reduce the amount of gaseous impurities in the nonadsorbed product gas.

According to a preferred embodiment of the invention, a gas stream, such as air, is introduced into an adsorption vessel containing a low silicon X zeolite of the type described above. The gas stream may be at a temperature as low as −50° C., or less, or as high as 80° C. Provided that the concentration of carbon dioxide in the gas stream is not so great that its partial pressure significantly exceeds about 25 mbar, substantially all of the carbon dioxide will be removed from the gas stream, and the substantially carbon dioxide-free product gas will issue from the nonadsorbed product gas outlet of the adsorption vessel. When the carbon dioxide adsorption front reaches a predetermined point in the adsorption vessel, usually near the nonadsorbed product gas outlet, the adsorption process in the vessel is terminated, and the adsorbent bed contained in the vessel is regenerated in one of the methods described above. If the adsorption plant is a multiple bed system adsorption will immediately begin in a second bed, so that the continuity of the purification process will not be interrupted. The purified gas can be subjected to further processing. For example, in cryogenic air separation operations, the prepurified air is sent to a cryogenic distillation (or adsorption) plant for fractionation into one or more high purity gases, e.g. 80% pure oxygen, nitrogen or argon). If desired, a waste gas stream from the air separation plant can be recycled to the prepurification plant for use as purge gas during bed regeneration. The above process can be conducted efficiently for an indefinite period of time, since the effectiveness of the adsorption process will not be substantially adversely affected by temperature increases occurring during the adsorption process.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

Equilibrium adsorption isotherms for carbon dioxide were measured using a Cahn microbalance at a series of pressures in the range of 2 to 300 mbar at temperatures of 5° C., 35° C. and 50° C. for a conventional sodium X zeolite (Na X) having a silicon-to-aluminum atomic ratio of 1.25 and for the sodium form of type X zeolite having a silicon-to-aluminum atomic ratio of 1.02 (Na LSX). Each sample of adsorbent (about 60 mg) was activated by being evacuated at 350° C. for 1.5 hours before the first run and between the isotherms taken at each temperature. Each test was conducted until equilibrium was achieved, which required up to 3 hours for the lowest partial pressures of carbon dioxide. In addition to the NaX and NaLSX runs, runs were conducted using lithium- and rare earth-exchanged type X zeolite and lithium- and calcium-exchanged type X zeolite at 35° C. for each of the stated pressures. The results of the experiments are recorded in the table.

TABLE

| Press., mbar Adsorbent | Temp., °C. | 2 | 5 | 10 | 25 | 50 | 100 | 300 |
|---|---|---|---|---|---|---|---|---|
| | | \multicolumn{7}{c}{Carbon Dioxide Uptake, mmol/gm of adsorbent} | | | | | | | |
| NaX | 5 | 1.24 | 1.80 | 2.23 | 2.92 | 3.53 | 4.11 | 4.79 |
| NaLSX | 5 | 2.44 | 2.89 | 3.36 | 4.21 | 4.94 | 5.58 | 6.23 |
| NaX | 35 | 0.45 | 0.87 | 1.26 | 1.82 | 2.26 | 2.78 | 3.73 |
| NALSX | 35 | 1.50 | 2.05 | 2.41 | 2.89 | 3.38 | 4.01 | 5.16 |
| Li, RE LSX | 35 | 1.74 | 2.44 | 2.85 | 3.29 | 3.63 | 4.02 | 4.68 |
| Li, Ca LSX | 35 | 1.78 | 2.58 | 3.06 | 3.56 | 3.92 | 4.33 | 5.03 |
| NaX | 50 | 0.25 | 0.55 | 0.87 | 1.41 | 1.83 | 2.27 | 3.14 |
| NaLSX | 50 | 1.01 | 1.61 | 2.03 | 2.51 | 2.89 | 3.39 | 4.46 |

From the table it is clear that at moderately high $CO_2$ partial pressures (up to 300 mbar) that LSX adsorbents of this invention have $CO_2$ capacities in the range of 30 to 40% higher than that of the conventionally used sodium X adsorbent. This is expected partly as a result of the 12.5% increased ion exchange capacity of LSX versus conventional X. The unexpected nature of this invention is exemplified in the results obtained at 25 mbar or less, and is particularly shown in the 5 mbar run (corresponding to a partial pressure of $CO_2$ in typical air at a pressure of about 15 atmospheres) and at temperatures greater than 20° C. The capacities of the adsorbents of this invention are more than double, and in some cases more than four times those of the conventional X adsorbent under the same conditions. Indeed, inspection of Table 1 shows that the capacities of the adsorbents of this invention at 50° C. are comparable to those of conventional X at its normal operating temperature of 5° C. The capacity of conventional X at 50° C. is too low to be useful commercially. Equilibrium adsorption isotherms for carbon dioxide were also measured at 35° C. for lithium-rare earth exchanged adsorbent samples (Li, RE LSX) made from the LSX zeolite used in Example I(containing 86 equivalent % lithium ions and 12 equivalent % rare earth ions, derived from a commercial mixed rare earth chloride solution supplied by Moly Corp., Inc., with composition approximately 67% $LaCl_3$, 23% $NdCl_3$, 9% $PrCl_3$, 1% $CeCl_3$), and for lithium-calcium exchanged adsorbent samples (Li, Ca LSX) made from the LSX zeolite used in Example I (containing 95 equivalent % lithium ions and 5 equivalent % calcium ions).

Although the invention has been described with particular reference to specific equipment arrangements, to specific adsorption cycles, and to specific experiments, these features are merely exemplary of the invention and variations are contemplated. For example, the adsorption cycle may include more than two bed equalization steps, and the purge step and/or the nonadsorbed product backfill step may be included or eliminated, as desired. Furthermore, the duration of the individual steps and the operating conditions may be varied. The scope of the invention is limited only by the breadth of the appended claims.

What is claimed is:

1. A method of removing carbon dioxide from a gas stream comprised of carbon dioxide and gases less polar than carbon dioxide, comprising subjecting said gas stream to adsorption using as adsorbent a type X zeolite having a silicon to aluminum atomic ratio in the range of about 1.0 to about 1.15 at a temperature in the range of about −50° to about 80° C., thereby adsorbing carbon dioxide from said gas stream and producing a nonadsorbed product gas enriched in said gases less polar than carbon dioxide.

2. The method of claim 1, wherein the adsorption is part of a cyclical process which comprises an adsorption step and an adsorbent regeneration step and which is selected from the group consisting of temperature swing adsorption, pressure swing adsorption, vacuum swing adsorption and combinations of these.

3. The method of claim 2, wherein said adsorbent is type X zeolite having a silicon to aluminum atomic ratio in the range of about 1.0 to 1.1.

4. The method of claim 2, wherein said adsorption step is carried out at a temperature in the range of about 20° to about 80° C.

5. The method of any one of claims 1 to 4, wherein said adsorbent is type X zeolite whose exchangeable cations are selected from the group consisting of ions of Group 1A, ions of Group 2A, ions of Group 3A, ions of Group 3B, ions of the lanthanide series and mixtures of these.

6. The method of any one of claims 1 to 4, wherein carbon dioxide is present in said gas stream at a partial pressure not greater than about 25 mbar.

7. The method of any one of claims 2 to 4, wherein said gas stream is oxygen, nitrogen, argon, hydrogen, helium or mixtures of these.

8. The method of claim 2, wherein carbon dioxide is present in said gas stream at a partial pressure not greater than about 10 mbar.

9. The method of claim 8, wherein the adsorbent is type X zeolite having a silicon-to-aluminum atomic ratio of about 1.0.

10. The method of claim 4, wherein carbon dioxide is present in said gas stream at a partial pressure not greater than about 5 mbar.

11. The method of claim 7, wherein the adsorption step of said process is carried out at a temperature in the range of about 30° to about 60° C.

12. The method of claim 11, wherein said gas stream is air.

13. The method of claim 7, additionally comprising, prior to removing carbon dioxide from said gas stream, removing water vapor from the gas stream by passing the gas stream through an adsorbent selected from alumina, silica gel, zeolites, and mixtures of these.

14. The method of claim 1, wherein said gas stream is oxygen, nitrogen, argon, hydrogen, helium or mixtures of these.

15. A method of separating air comprising the steps:
    (a) prepurifying air by subjecting the air to a temperature swing adsorption process comprising an adsorption phase. and an adsorbent regeneration phase using as adsorbent a type X zeolite having a silicon to aluminum atomic ratio not greater than 1.15, thereby adsorbing carbon dioxide from the air; and
    (b) subjecting the prepurified air to cryogenic distillation, thereby producing high purity nitrogen, high purity oxygen or both of these.

16. The method of claim 15, wherein said adsorbent additionally adsorbs water vapor from said air.

17. The method of claim 15, additionally comprising, prior to step (a), the step of removing water vapor from the air by passing the air through an adsorbent selected from alumina, silica gel, zeolites and mixtures of these.

18. The method of claim 15, wherein the adsorption phase of step (a) is carried out at a temperature in the range of about 20° to about 80° C.

19. The method of claim 18, wherein said adsorbent is type X zeolite having a silicon to aluminum atomic ratio in the range of about 1.0 to 1.1.

20. The method of claim 19, wherein the adsorption phase of step (a) is carried out at a temperature in the range of about 30° to about 60° C.

21. The method of claim 20, wherein said adsorbent is type X zeolite having a silicon to aluminum atomic ratio of about 1.0.

22. The method of claim 21, wherein carbon dioxide is present in said air at a partial pressure not greater than about 5 mbar.

23. The method of claim 15, wherein carbon dioxide is present in said air at a partial pressure not greater than about 25 mbar.

* * * * *

(12) EX PARTE REEXAMINATION CERTIFICATE (5299th)
United States Patent
Ojo et al.

(10) Number: US 5,531,808 C1
(45) Certificate Issued: Mar. 14, 2006

(54) REMOVAL OF CARBON DIOXIDE FROM GAS STREAMS

(75) Inventors: Adeola F. Ojo, Chatham, NJ (US); Frank R. Fitch, Bedminster, NY (US); Martin Bülow, Basking Ridge, NJ (US)

(73) Assignee: The BOC Group, Inc., New Providence, NJ (US)

Reexamination Request:
No. 90/006,768, Aug. 29, 2003

Reexamination Certificate for:
Patent No.: 5,531,808
Issued: Jul. 2, 1996
Appl. No.: 08/363,187
Filed: Dec. 23, 1994

(51) Int. Cl.
*B01D 53/047* (2006.01)

(52) U.S. Cl. .............................. 95/96; 95/101; 95/122; 95/139; 95/902

(58) Field of Classification Search ............ 95/95–105, 95/117–123, 126, 139, 902
See application file for complete search history.

(56) References Cited

U.S. PATENT DOCUMENTS

| | | | |
|---|---|---|---|
| 2,882,244 A | 4/1959 | Milton | 252/455 |
| 3,885,927 A * | 5/1975 | Sherman et al. | 95/139 |
| 4,775,396 A | 10/1988 | Rastelli et al. | 55/58 |

FOREIGN PATENT DOCUMENTS

| | | |
|---|---|---|
| EP | 0 196 103 | 3/1986 |
| EP | 0 294 588 A2 | 5/1988 |
| EP | 0284850 A2 * | 10/1988 |
| EP | 0 284 850 B1 | 6/1992 |
| GB | 1 580 928 | 12/1980 |

OTHER PUBLICATIONS

D. W. Breck, *Zeolite Molecular Sieves*, 1984, Robert E. Krieger Publishing Company, excerpt "Zeolites of Group 4" (pp. 92–94).

Article entitled "Adsorption of Carbon Dioxide on Zeolites in Relation to the Content of Cations in their Crystal Lattices" by Khvoshchev et al., *Russian Journal of Physical Chemistry*, 42 (1), 1968, pp. 87–90.

Paper entitled "Investigation of the Isosteric Heat of Adsorption of Carbon Dioxide on Synthetic Sodium Zeolites of Different Structural Types" by Khvoshchev et al., published in "Proceedings of the Third Soviet Adsorbent Conference" 1971, pp. 121–124.

* cited by examiner

*Primary Examiner*—Frank M. Lawrence

(57) ABSTRACT

Carbon dioxide is removed from gas streams comprised predominantly of gases that are less polar than carbon dioxide by passing the gas stream through a bed of type X zeolite having a silicon to aluminum atomic ratio not greater than about 1.15, thereby adsorbing the carbon dioxide from the gas stream. The process is particularly advantageous when applied to the removal of low levels of carbon dioxide from gas streams at temperatures above 20° C.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 5, 6 and 23 are cancelled.

Claims 1, 3, 4, 7, 8 and 15 are determined to be patentable as amended.

Claims 9–14 and 16–22, dependent on an amended claim, are determined to be patentable.

1. A method of removing carbon dioxide from a gas stream comprised of carbon dioxide and gases less polar than carbon dioxide, comprising subjecting said gas stream to *a temperature swing* adsorption *process which comprises an adsorption step and an adsorbent regeneration step* using as adsorbent a *sodium* type X zeolite having a silicon to aluminum atomic ratio in the range of about 1.0 to about 1.15 at a temperature in the range of about −50° to about 80° C[.]*, and said carbon dioxide in said gas stream is present at a partial pressure not greater than about 25 mbar,* thereby adsorbing carbon dioxide from said gas stream and producing a nonadsorbed product gas enriched in said gases less polar than carbon dioxide.

3. The method of claim [2]*1*, wherein said adsorbent is type X zeolite having a silicon to aluminum atomic ratio in the range of about 1.0 to 1.1.

4. The method of claim [2]*1*, wherein said adsorption step is carried out at a temperature in the range of about 20° to about 80° C.

7. The method of any one of claims [2] *3* to 4, wherein said gas stream is oxygen, nitrogen, argon, hydrogen, helium or mixtures of these.

8. The method of claim [2]*1*, wherein carbon dioxide is present in said gas stream at a partial pressure not greater than about 10 mbar.

15. A method of separating air comprising the steps:
(a) prepurifying air by subjecting the air to a temperature swing adsorption process *wherein carbon dioxide is present in said air at a partial pressure not greater than about 25 mbar* comprising an adsorption phase[.] and an adsorbent regeneration phase using as adsorbent a *sodium* type X zeolite having a silicon to aluminum atomic ratio not greater than 1.15, thereby adsorbing carbon dioxide from the air; and
(b) subjecting the prepurified air to cryogenic distillation, thereby producing high purity nitrogen, high purity oxygen or both of these.

* * * * *